April 14, 1942. A. J. JANSSEN 2,279,321
DISTANCE AND HEIGHT METER
Filed Nov. 6, 1940 3 Sheets-Sheet 1
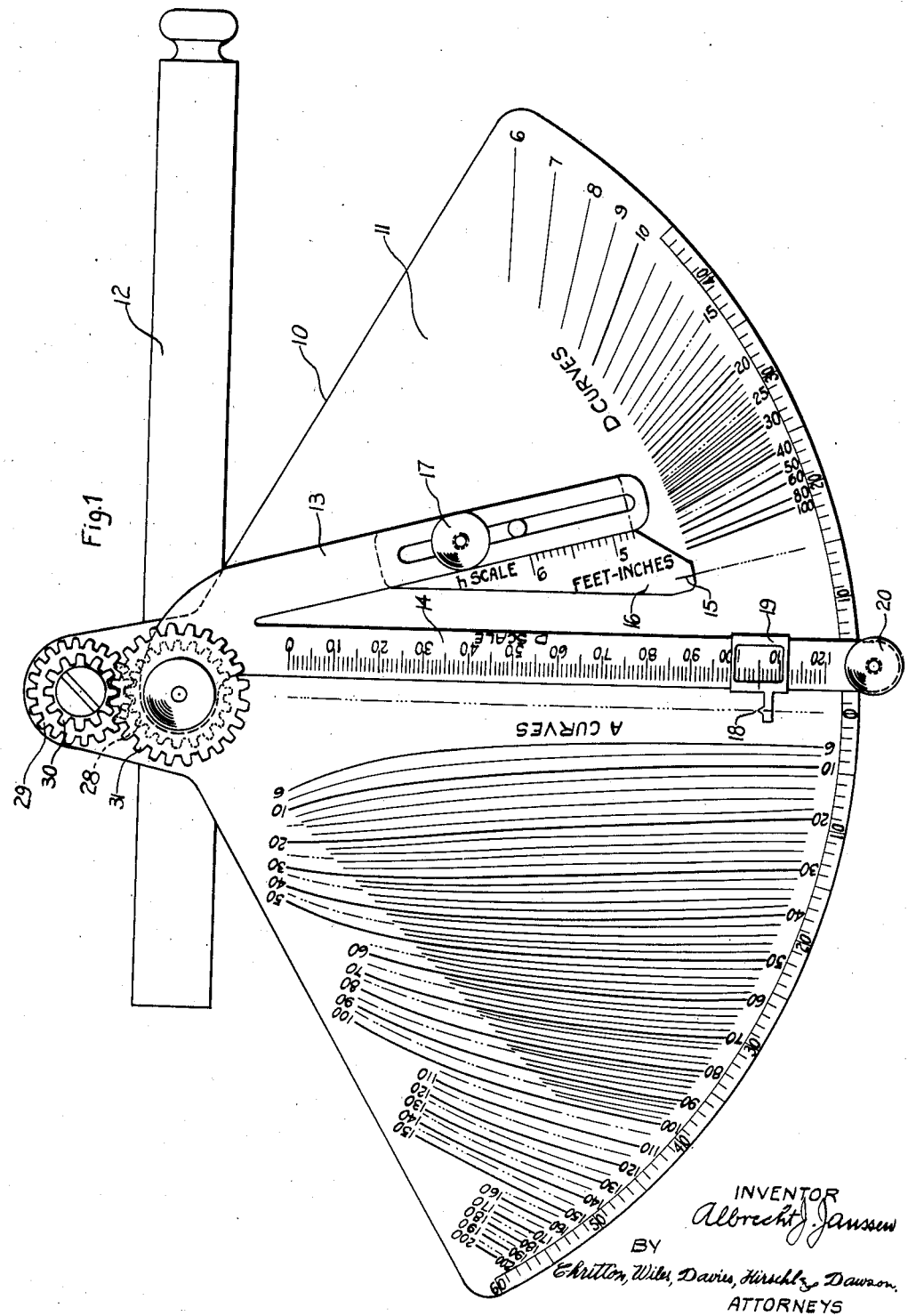

April 14, 1942.  A. J. JANSSEN  2,279,321
DISTANCE AND HEIGHT METER
Filed Nov. 6, 1940  3 Sheets-Sheet 2
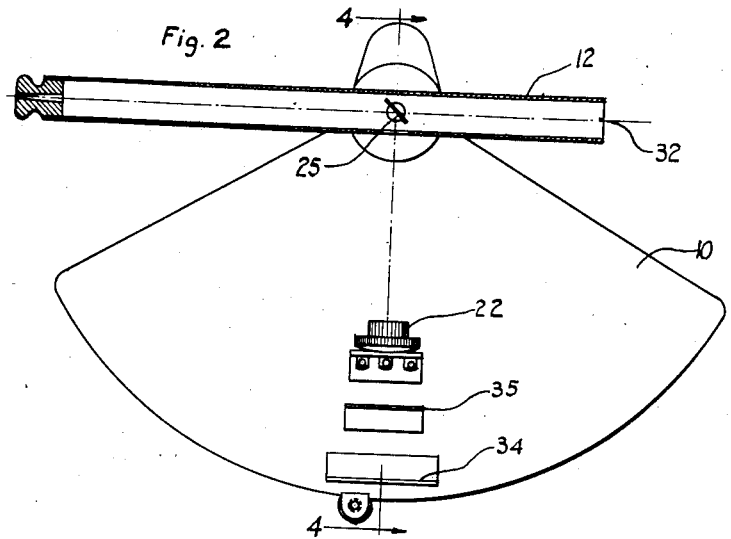
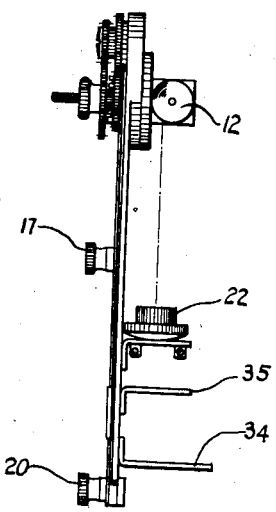
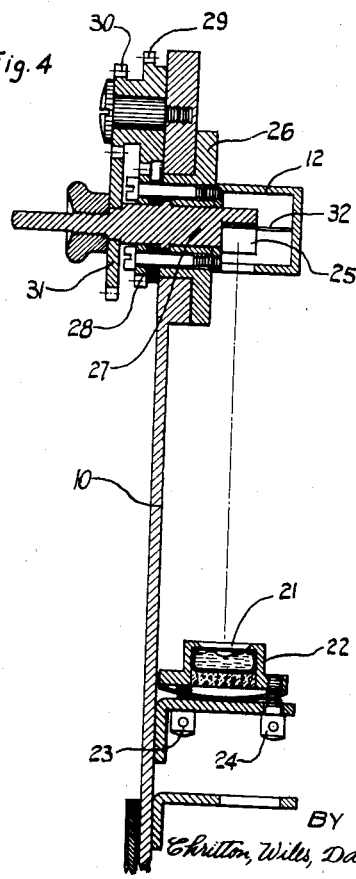
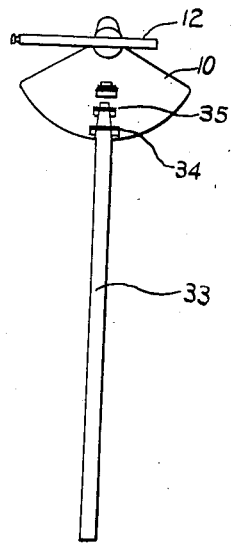
INVENTOR
Albrecht J. Janssen
BY
Chritton, Wiles, Davies, Hirschl & Dawson.
ATTORNEYS April 14, 1942.　　　A. J. JANSSEN　　　2,279,321
DISTANCE AND HEIGHT METER
Filed Nov. 6, 1940　　　3 Sheets-Sheet 3
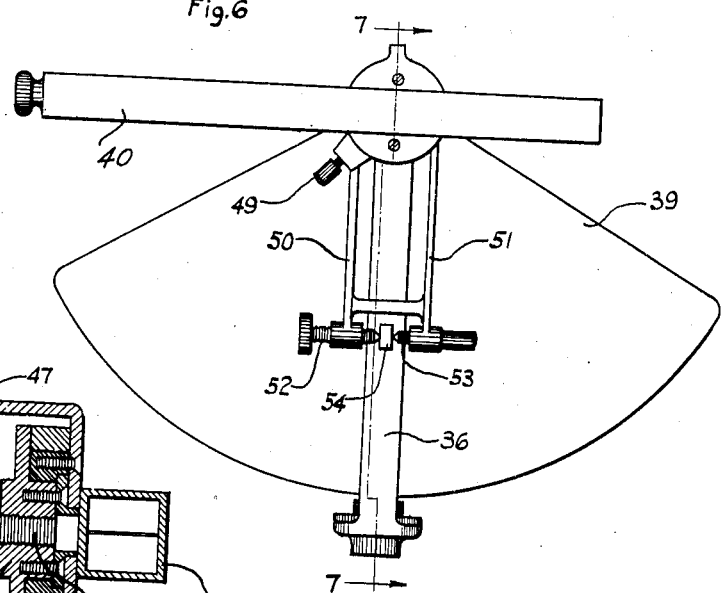
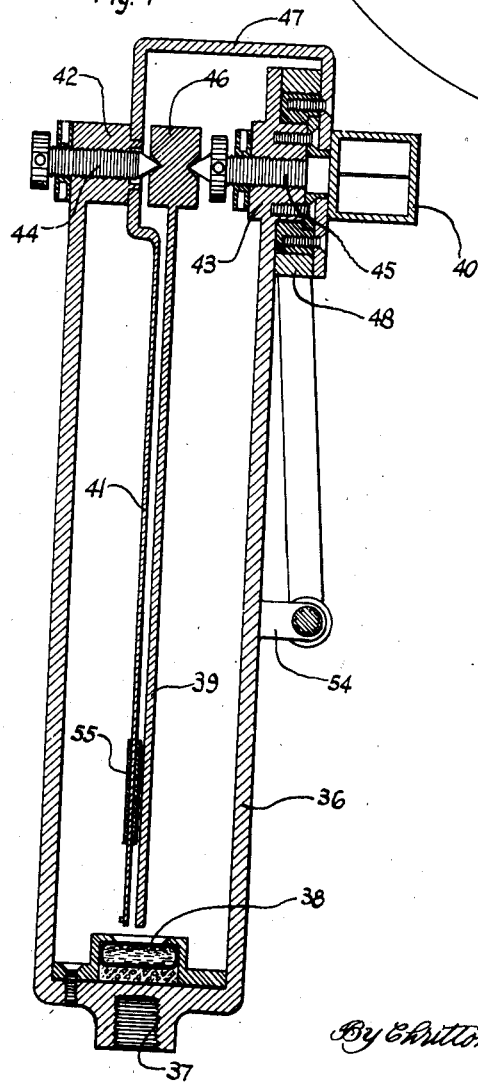
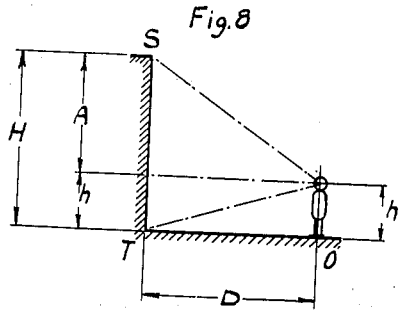
INVENTOR
Albrecht J. Janssen
BY Chritton, Wiles, Davies, Hirschl & Dawson
ATTORNEYS Patented Apr. 14, 1942

2,279,321

UNITED STATES PATENT OFFICE 2,279,321

DISTANCE AND HEIGHT METER

Albrecht J. Janssen, Lombard, Ill.

Application November 6, 1940, Serial No. 364,571

5 Claims. (Cl. 33—71)

This invention relates to a distance and height meter, and more particularly to improved means for making lineal measurements from a point removed from the line being measured.

One feature of this invention is that it provides means for making lineal measurements without physically traversing or spanning the line to be measured; another feature of this invention is that it enables measurement of distance from a given spot to another spot being sighted; a further feature of this invention is that it enables determination of the height of an object, or a part thereof, from a point removed from the object; still another feature of this invention is that it requires no mathematical ability or calculations for its use, the instrument giving desired readings directly; yet another feature of this invention is that the instrument is readily portable, and adapted to provide the desired readings even when it is merely hand held; other features and advantages of this invention will be apparent from the following specification and the drawings, in which:

Figure 1 is a front elevation of an instrument embodying this invention; Figure 2 is a rear elevation, partly in section of the same instrument; Figure 3 is a side elevation thereof; Figure 4 is a sectional view along the line 4—4 of Figure 2; Figure 5 is a rear elevation of the instrument and supporting means; Figure 6 is an elevation of another instrument embodying my invention in a modified form; Figure 7 is a vertical sectional view along the line 7—7 of Figure 6; and Figure 8 is a diagrammatic view illustrative of one use of an instrument embodying this invention.

The present application is a continuation-in-part of my copending application Serial No. 211,675, filed June 3, 1938, now abandoned.

It is frequently desirable to make lineal measurements such as distance or height without having to physically traverse the line to be measured, and without having to perform complex mathematical calculations. The present invention provides means for conveniently and quickly making such measurements by merely getting a sight and making an adjustment of an indicating means, whereupon the lineal measurement may be read off directly from the instrument. Distances from an observer may be measured by sighting at the point whose distance is to be determined, and graphically correlating the angle and the instrument height to give the desired reading directly. In this case the height of the instrument is being used as the known side of a right angle triangle, one angle being determined by observation. Where it is desired to determine the height of an object from a point level with the instrument it is merely necessary to sight at the top of the object and then to set an indicator at the distance of the observer from the object, which may have been known or determined in accordance with the preceding manner, whereby the height may be read directly from the instrument.

In the particular embodiment of my invention illustrated herewith in Figures 1 to 5 the instrument comprises a main or body portion 10 shaped substantially in the form of a sector of a circle for convenience. Mounted on one surface of the body portion, which will hereinafter be called the face or the front of the instrument, is a dial 11 having a scale means engraved or otherwise marked thereon, the righthand scale (speaking with respect to Figure 1) being hereinafter identified as the D scale, and the lefthand one as the A scale. The dial may also have its lower arcuate margin calibrated in degrees each side of a center point or zero line, as shown.

At the top of the instrument a pivotal mounting is provided for a sighting means or telescope 12 and a pair of indicator arms 13 and 14, these arms being locked to the telescope 12 and movable therewith about the pivot point. It will be readily apparent that the body portion and the sighting means are connected together for movement relative to each other about a common axis, which axis would be horizontal during normal usage of the instrument.

Each of the indicator arms bears adjustable indicating means. The arm 13, for example, has the indicating line or means 15 on a member 16 movable along the arm 13, slidably splined thereto in any convenient manner, and adapted to be locked in position, as by the thumb screw 17. The indicating arm 14 is provided with indicating means in the form of a pointer 18 carried on a member 19 slidable therealong. Each of the arms is provided with a scale enabling adjustment of the indicating means in accordance with the known side of the triangle of observation, whether it be the height of the instrument or the distance from an object. The arm 14 is here shown to extend below the body member 10 and to be provided with clamping means operated by the thumb screw 20 to enable the sighting means and indicator arms to be locked at any desired angular position relative to the body portion of the instrument.

The instrument is provided with means enabling leveling of the body portion, here shown as level indicating means on the body portion and reflecting means enabling sighting of the level indicating means coincident with sighting of the object or point with respect to which measurements are being made. The level indicating means is here shown in the form of a circular bubble vial or tube 21 carried in the supporting means 22 mounted so as to be properly adjustable with respect to the body portion, as by three adjusting screws, screws 23 and 24 being identified in Fig. 4. The leveling means is here shown of the conventional circular type, including liquid and a bubble, capable of indicating when the body portion is level in all directions; being conventional, it will not be more fully described.

The reflecting means is here shown in the form of a mirror 25 mounted in the tube of the telescope 12 so as to be rotatable about the same horizontal axis as the telescope, the mirror occupying part, as half, of the sighting field or sight line through the telescope. As may be best seen in Figures 2 and 4, the mirror is operatively interconnected to the telescope to be movable therewith in a corresponding direction; but the arrangement is such that the mirror moves through only half of the arc of movement of the telescope. The telescope tube 12 is mounted on a hollow bearing member 26 rotatable within a bearing provided by the body portion 10; while the mirror is carried by a shaft 27 passing through the opening in this bearing member 26 and concentric therewith, the shaft 27 and bearing member 26 being independently movable. The desired interconnection is attained by a gear train which will now be traced. A gear 28 fixed with respect to the bearing member 26 meshes with a gear 29, here shown of equal size. Integral with the gear 29 is a somewhat smaller gear 30 which meshes with a gear 31 on the shaft 27. The relative sizes of these latter gears are as two to one, so that rotational movement of the telescope is translated into corresponding movement of the shaft 27 through half of the arc of movement of the telescope tube.

In use, a sight is taken by the observer through the telescope 12 at some particular point, which point may be at the other end of a distance to be measured, or at the top or some intermediate part of an object, for example. The mirror 25 in the telescope 12 is, of course, so arranged as to always be tangent to the bisector of the angle between the sighting line through the telescope and the line from the bubble tube to the mirror. Because of this arrangement an observer sighting through the telescope 12 sees both the point being sighted and the bubble in the leveling tube 21, enabling proper leveling of the body portion of the instrument while the telescope is sighted on a particular point. Proper alignment of the sighted point and the bubble is facilitated, in conventional manner, by use of the horizontal cross wire 32. When proper leveling of the body portion coincident with exact sighting of the telescope on the object point is attained the parts of the instrument may be locked together by manipulation of the thumb screw 20, if desired, so that the scales may be read without any possibility of disturbance of the relationship between the parts of the instrument.

While the instrument is readily portable and may be conveniently used in the hands if desired, it is sometimes preferable to furnish a steady support. One means of doing this is illustrated in Figure 5, where a staff 33 with a tapered point is inserted through openings provided in brackets 34 and 35 on the body 10 of the instrument.

Another instrument embodying a modified form of my invention is illustrated in Figures 6 and 7. In this form a U-shaped yoke 36 is provided as a mounting for both the body and sighting portions of the instrument. The yoke may, if desired, be in turn mounted on a tripod or similar supporting means, a threaded opening 37 being provided to receive a tripod mounting screw. The yoke carries a circular leveling vial or tube 38, enabling the yoke to be brought to proper or leveled position by movement of the tripod legs, for example, before a sight is taken.

In this form of the invention the body portion 39 of the instrument is mounted for very free pivotal movement with respect to the yoke; and the sighting means or telescope tube 40 and indicator arms, as 41, while locked together, are also mounted for pivotal movement with respect to the yoke, the axis of movement of both parts being the same. As before, in normal use, this axis would be horizontal.

Turning more particularly to Figure 7, it will be seen that the upper ends of the frame or yoke 36 are provided with cylindrical enlargements 42 and 43. Pointed pivot screws 44 and 45 are threaded into these enlargements and adapted to be locked in proper position, as by capstan nuts, with their points in conical bearing openings in an enlargement 46 at the top of the body portion 39.

The enlargements 42 and 43 are provided with exterior cylindrical bearing surfaces serving as a mounting for an overhead bridge member 47 carrying the sighting tube 40 and the indicator arms, as 41. It will thus be seen that the sighting and indicating means and the body portion of the instrument are both movable with respect to each other about a common horizontal axis, the movement of the body portion being particularly free. This enables the body portion to be self-leveling, its weight automatically causing it to assume the proper position with its zero line vertical.

If desired, means for attaining micrometer motion of the sighting tube and indicator arms may be provided. This is shown as a ring-shaped bearing 48 adapted to be clamped or locked to the ring carrying the sighting tube, as by the clamp screw 49. Two arms 50 and 51 depend from this ring, one carrying a fine motion screw 52 and the other a spring-pressed plunger 53. The points of both of these last mentioned elements are adapted to bear against a nose or shoulder 54 on the yoke 36. It will be seen that when the sighting tube has been gotten to approximately the proper position the clamp screw 49 can be tightened and the last accurate motion effected by rotation of the screw 52.

This last mentioned embodiment of my invention operates in general in the same manner as the first mentioned embodiment to indicate distances or heights. The indicator arm 41 carries a slidable member 55, adjustable toward and away from the axis of rotation of the parts with respect to the distance of the observer from an object; and an indicator point carried by this part 55 is adapted to cooperate, as before, with A scales on the face of the body portion 39 of the instrument, this being sector-shaped and provided with the same kind of a dial as the instrument shown in Figures 1 to 5.

Another indicator arm, not shown in these views, would correspond to the indicator arm 13 in the first instrument and cooperate with D scales to indicate the distance of the observer from an object being sighted.

Either instrument is capable of making various lineal measurements under a multitude of conditions, its various methods of use being readily apparent and easily mastered by an observer who once understood the fundamental basis of its operation. For purposes of illustration the diagrammatic showing in Figure 8 illustrates a couple of the easiest and most common uses of the device, which will be described in detail. It may be assumed, for example, that an observer is standing at a point O level with but at an unknown distance D from the base of a building or similar object of unknown height H. In order to determine both his distance from the building and the height of the building the observer would then proceed in the following manner.

Describing the operation first with the instrument illustrated in Figures 1 to 5, the device would be held at eye level and the telescope moved with respect to the body portion thereof until the observer was sighting at the base T of the building with the body portion of the instrument level; that is, with the bubble in the center of the circular vial and registering with the cross wire, coinciding in the field of view with the base T. The observer would then lock the movable parts in this relation by turning the thumb screw 20, and would next set the movable member 16 on the arm 13 at a point corresponding with the instrument height.

In this regard, it will be understood that the "height" spoken of throughout this application is the height above the ground of the pivot point or axis about which the sighting tube is movable. When the instrument is supported on a staff or tripod the height would be fixed by such supporting means; but when the instrument is merely held in the hands its effective height, speaking with respect to the pivot point, would depend upon the eye height of the observer. That is, height, distance, and similar terms are used with respect to the pivot point or axis of the instrument. The D scale on the dial of the instrument is so calibrated that correlation of the height of the instrument and the angle between the perpendicular and the ray from the base T of the object enables determination of the distance D directly from this scale. In order to determine the height of the building the observer would next unlock the thumb screw 20 and rotate the telescope tube 12 about its axis of movement while sighting therethrough at the top S of the building, until this point S was in the proper position in the field of view, registering with the cross hairs, with the body portion of the instrument level, as determined by the proper position of the bubble in the circular vial. Then the movable parts would be locked in position by use of the thumb screw 20, thus maintaining the angle spanning the distance from a point level with the observer's eye to the top of the building; that is, the angle between the rays from these two points. The observer would then slide the movable member 19 along the arm 14 until it was in a position corresponding to the distance D previously determined, whereupon the distance A could be read directly from the line of the A scale immediately beneath the pointer 18. In order to determine the total height of the building, indicated on the diagram as H, it would then only be necessary to arithmetically add the distance A and the instrument height h.

In using the instrument particularly illustrated in Figures 6 and 7, a generally similar procedure would be followed. In this case the axis of the screws 44 and 45 would first be brought to a level position by movement of the yoke, either in the hands or on its tripod or staff support. The sighting tube would then be moved about its axis until the base point T or the top of the building S (depending upon whether the distance or height measurement was being made) was in registry with the cross hairs. The body portion of the instrument, swinging free, is self-leveling; so that without the need of any conscious leveling of this portion of the instrument the desired lineal measurement could be read directly from the appropriate scale after the indicating means had been adjusted as before described. The micrometer means previously described could be used to get the most accurate possible registry of the sighted point with the cross hairs; and means could be used for locking the body portion of the instrument against swinging movement while the reading was being made.

It will be apparent that both of the instruments particularly described here operate on the same basic principle, and that by the use of my invention a number of other lineal measurements under varying conditions may be conveniently and readily made by graphical determination by correlating an observed or known angle with a known side, which may be either the instrument height or some known distance.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for making lineal measurements, including: a body portion; leveling means whereby said body portion may be brought to a predetermined position relative to the horizontal; sighting means pivotally mounted on said body portion on a normally horizontal axis; scale means on said body portion calibrated in lineal units; indicating means moved by pivotal movement of said sighting means, said indicating means being adjustable toward and away from the point of pivoting of the sighting means in accordance with the height of the apparatus and being adapted to cooperate with said scale means to indicate the distance of the observer from an object; a second scale means on the body portion; and a second indicating means moved by pivotal movement of said sighting means, said second indicating means being adjustable toward and away from the point of pivoting of the sighting means in accordance with the distance of the observer from said object and being adapted to cooperate with said second scale means to indicate the height of a definite portion of said object when the upper extremity thereof is observed through said sighting means.

2. Apparatus of the character described for making lineal measurements, including: a body portion; means for indicating when said body portion is level; sighting means pivotally mounted on said body portion; scale means on said body portion calibrated in lineal units; indicating means movable with said sighting means and movable over said scale, said scale being graduated to indicate the distance of an observer using the apparatus from an object; second scale means on said body portion; and a second indicating means movable with the sighting means and movable over said second scale to cooperate therewith, said second scale being graduated to indicate the height of a definite portion of the object.

3. Apparatus of the character described for making lineal measurements, including: a body portion; means for indicating when said body portion is level; sighting means pivotally mounted on said body portion; scale means on said body portion calibrated in lineal units; indicating means carried by said sighting means and movable therewith, said means being adjustable toward and away from the pivot in accordance with the height of the apparatus and adapted to cooperate with said scale means to indicate the distance of said observer from an object; second scale means on said body portion; and a second indicating means carried by said sighting means and movable therewith, said indicating means being adjustable toward and away from the pivot in accordance with the distance of said observer from said object and adapted to cooperate with said second scale means to indicate the height of a definite portion of said object.

4. Apparatus of the character described for making lineal measurements, including: a body portion; sighting means, both the body portion and means being pivotally mounted about a common horizontal axis and the body portion being mounted with sufficient freedom of movement to be self-leveling with respect to said sighting means; scale means on said body portion calibrated in lineal units; indicating means movable with said sighting means and moved by pivotal movement thereof, said indicating means being adjustable toward and away from the point of pivoting of the sighting means in accordance with the height of the apparatus and being adapted to cooperate with said scale means to indicate the distance of the observer from an object; a second scale means on the body portion; and a second indicating means moved over said second scale by pivotal movement of said sighting means, said second indicating means being adjustable toward and away from the point of pivoting of the sighting means in accordance with the distance of the observer from said object and being adapted to cooperate with said second scale means to indicate the height of a definite portion of said object when the upper extremity thereof is observed through said sighting means.

5. Apparatus of the character described for making lineal measurements, including: a body portion; leveling means whereby said body portion may be brought to a predetermined position relative to the horizontal; a sighting portion, both the body and sighting portions being pivotally mounted on the same axis to be movable with respect to each other; scale means on one of said portions calibrated in lineal units; indicating means movable with the other of said portions and moved by pivotal movement of such portion, said indicating means being movable over said scale, said scale being graduated to indicate the distance of an observer using the apparatus from an object; a second scale means on one of said portions; and a second indicating means moved by pivotal movement of the other portion and movable over said second scale to cooperate therewith, said second scale being graduated to indicate the height of a definite portion of the object when the upper extremity thereof is observed through said sighting means.

ALBRECHT J. JANSSEN.